United States Patent [19]

Cole

[11] Patent Number: 4,757,963
[45] Date of Patent: Jul. 19, 1988

[54] DUCT FOR HOT AIR

[75] Inventor: Derek Cole, Bangor, Northern Ireland

[73] Assignee: Short Brothers PLC, Northern Ireland

[21] Appl. No.: 868,286

[22] Filed: May 28, 1986

[30] Foreign Application Priority Data

Jun. 3, 1985 [GB] United Kingdom ............. 8513904

[51] Int. Cl.⁴ .......................................... B64D 15/04
[52] U.S. Cl. ................................ 244/134 B; 60/39.093
[58] Field of Search ........... 244/117 A, 134 R, 134 B, 244/134 C; 60/39.093

[56] References Cited

U.S. PATENT DOCUMENTS

| | | | |
|---|---|---|---|
| 2,081,963 | 6/1937 | Theodorsen et al. | 244/134 |
| 2,207,242 | 7/1940 | DeSeversky | 244/53 R |
| 2,473,387 | 6/1949 | Peters et al. | 244/134 |
| 2,820,601 | 1/1958 | Crawford | 244/134 B |
| 2,868,483 | 1/1959 | Krueger | 244/134 |
| 3,830,290 | 8/1974 | Thamasett et al. | 165/70 |
| 4,406,431 | 9/1983 | Heuberger | 244/134 B |
| 4,482,114 | 11/1984 | Gupta et al. | 244/134 B |
| 4,603,824 | 8/1986 | McArdel | 244/134 B |

Primary Examiner—Galen Barefoot
Assistant Examiner—Rodney Corl
Attorney, Agent, or Firm—Kenyon & Kenyon

[57] ABSTRACT

Damage to the skin of the annular cowl (11) of the intake duct of a turbo-fan engine of an aircraft by exhausting on to it of hot air used within the cowl for de-icing its leading edge (10) is avoided by channelling spent air through an exhaust duct (15) to an exhaust aperture (21) in the surface of the cowl, and providing a heat shield (23) in the skin downstream of the exhaust aperture (21).

4 Claims, 1 Drawing Sheet

DUCT FOR HOT AIR

BACKGROUND OF THE THE INVENTION

1. Field of the Invention

This invention relates to a duct for conveying hot air to a selected area on the inside surface of the skin of an aerostructural leading-edge compartment of an aircraft for preventing accumulation of ice on the corresponding external surface of the skin in said selected area.

2. Related Art

It is known to channel hot air, derived from a turbo fan engine served by an inlet cowl, to a spray ring located within an annular leading edge compartment of the cowl. The hot air is sprayed from the spray ring onto the selected skin area and thence exhausts into the engine intake duct by means of an annular slot in the skin at the rear edge of the compartment.

It will be appreciated that total control over the rate of supply of the hot air may not be practicable, so that there may be occasions when the air exhausting from the exhaust slot into the engine intake is still at a temperature sufficient to introduce a risk of degradation of any composite structures present in the skin immediately downstream of the exhaust slot.

One object of the present invention is to obviate this hazard.

SUMMARY OF THE INVENTION

In accordance with the invention, the duct comprises a delivery duct through which hot air is channelled forwardly towards the leading edge, an exhaust duct through which spent air, that is, air which has flowed over the inside skin surface, is channelled rearwardly of the compartment, from the compartment to an exhaust aperture in the aircraft skin, and a heat shield on the area of the skin immediately downstream of the aperture.

Preferably the delivery and exhaust ducts are provided as a double-walled duct comprising an inner delivery duct through which the hot air flows to the spray ring, and an outer exhaust duct connecting with the exhaust aperture in the outer skin.

In such a preferred embodiment, there is an open annulus between the inner and outer duct walls at their forward ends, thus allowing the spent anti-icing air to pass directly from the leading edge compartment to the duct annulus and thence overboard via the aperture in the outer skin.

Preferably an annulus over-pressure indicator is provided so that a failure of the inner duct wall which allows air to pass directly to the exhaust annulus can be detected and subsequent remedial action undertaken.

BRIEF DESCRIPTION OF THE DRAWINGS

In the accompanying drawings, given by way of example.

DESCRIPTION OF THE PREFERRED EMBODIMENT

Figure 1:
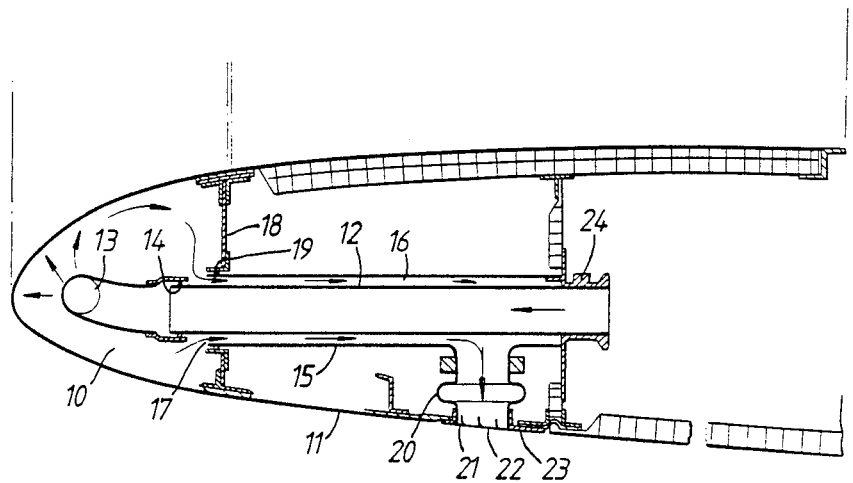
FIG. 1 is a longitudinal, radial section through the wall of an annular inlet cowl, and through an embodiment of a duct in accordance with the present invention.

In FIG. 1 there is shown a leading edge compartment 10 of the inlet cowl 11, served by a hot air delivery duct 12 to an air-dispensing spray ring 13, which ring is sealed to the duct 12 by a piston-type seal 14. Surrounding the delivery duc 12 is an exhaust duct 15 to define an annular exhaust passage 16 open at its front end 17 to the compartment 10 and sealed to a bulkhead 18 at the rear of the compartment 10 with another piston-type seal 19. Exhaust air is channelled along the passage 16 to an outlet duct 2 sealed to the outer duct 15 and to the periphery of an aperture 21 in the skin of the cowl 11, the aperture 21 being covered by a grille 22. Downstream of the aperture 21 is a heat shield 23. Within the exhaust passage 16 is a pressure sensor 24, connected to a sensor device arranged to alert cabin staff to any rise in pressure in the passage 16 consistent with rupture of the wall of the delivery duct 12.

Figure 2:
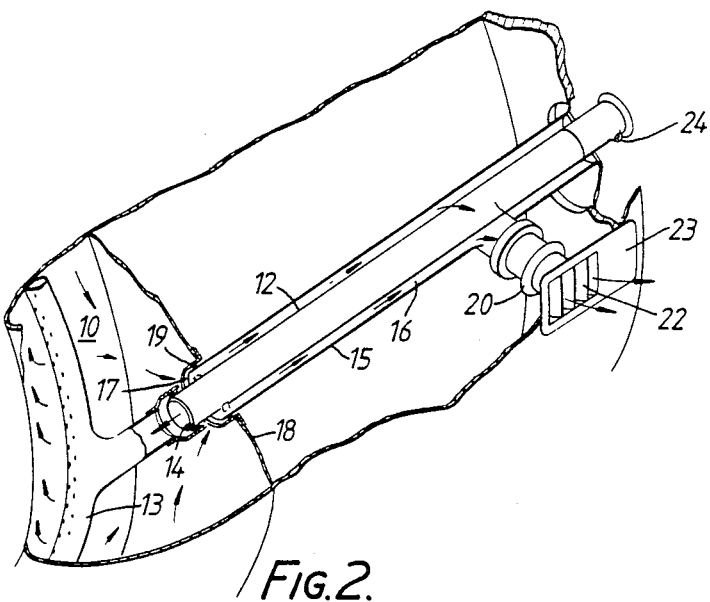
FIG. 2 is a perspective view of the embodiment of FIG. 1.

FIG. 2 shows, inter alia, more detial of the aperture 21, grille 22 and heat shield 23.

I claim:

1. A duct contained within a hollow aerostructural component of an aircraft, the duct serving to convey hot gas to a selected area on an inside surface of a skin of a leading-edge compartment of said aerostructural component for preventing accumulation of ice on an external surface of said selected area, the duct comprising:

a delivery duct portion having a rear opening connected to a source of said hot gas and a front opening communicating with said leading-edge compartment for delivering a flow of hot gas forwardly towards the selected area of the inside surface of said skin, an exhaust duct portion having a front inlet communicating with said leading-edge compartment and a rear outlet forming an exhaust aperture in the skin of the aerostructural component through which spent air, that is, gas which has flowed over the selected area of the inside skin surface, is channelled rearwardly from the compartment to the exhaust aperture in the aircraft skin, the exhaust duct being separate from and supported within the hollow aerostructural component, and wherein a heat shield is disposed on an area of the external surface of the skin immediately downstream of the exhaust aperture, and the delivery duct portion is contained within the exhaust duct portion such that hot gases being delivered to the leading-edge compartment will be contained by the exhaust duct portion in the event of rupture of the delivery duct portion and will not contact the interior of the aerostructural component.

2. A duct according to claim 1 wherein the compartment contains a dispenser for directing the hot gas towards the selected area of the inside surface of the skin of the compartment and the delivery duct portion is connected by a piston seal to the dispenser within the compartment.

3. A duct according to claim 1 and further comprising a pressure sensor for sensing within the exhaust duct any rise of pressure indicative of rupture of the wall of the delivery duct portion within the exhaust duct portion.

4. A duct contained within a hollow aerostructural component of an aircraft, the duct serving to convey hot gas to a selected area on an inside surface of a skin of a leading-edge compartment of said aerostructural component for preventing accumulation of ice on an external surface of said selected area, the duct comprising:
- a delivery duct portion having a rear opening connected to a source of said hot gas and a front opening communicating with said leading-edge compartment for delivering a flow of hot gas forwardly towards the selected area of the inside surface of said skin,
- an exhaust duct portion having a front inlet communicating with said leading-edge compartment and a rear outlet forming an exhaust aperture in the skin of the aerostructral component through which spent air, that is, gas which has flowed over the selected area of the inside skin surface, is channelled rearwardly from the compartment to the exhaust aperture in the aircraft skin, the leading-edge compartment having a rear bulkhead, and the exhaust duct portion being sealed to the bulkhead at the rear of the compartment by a piston seal, and wherein
- a heat shield is disposed on an area of the external surface of the skin immediately downstream of the exhaust aperture, and the delivery duct portion is contained within the exhaust duct portion such that hot gases being delivered to the leading-edge compartment will be contained by the exhaust duct portion in the event of rupture of the delivery duct portion.

* * * * *

UNITED STATES PATENT AND TRADEMARK OFFICE
CERTIFICATE OF CORRECTION

PATENT NO. : 4,757,963

DATED : July 19, 1988

INVENTOR(S) : Derek Cole

It is certified that error appears in the above-identified patent and that said Letters Patent is hereby corrected as shown below:

Column 2, line 3, delete "duc 12" and insert --duct 12--;

Column 2, line 8, delete "duct 2" and insert --duct 20--;

Column 2, line 16, delete "detial" and insert --detail--;

Column 3, line 12, delete "aerostructral" and insert --aerostructural--;

Signed and Sealed this

Twenty-ninth Day of November, 1988

Attest:

DONALD J. QUIGG

*Attesting Officer*  *Commissioner of Patents and Trademarks*